United States Patent [19]

Takanashi et al.

[11] Patent Number: 4,707,085
[45] Date of Patent: Nov. 17, 1987

[54] F$\theta$ LENS FOR USE IN LIGHT BEAM SCANNER

[75] Inventors: Kenichi Takanashi, Kanagawa; Nobuo Sakuma, Tokyo, both of Japan

[73] Assignee: Ricoh Company, Ltd., Tokyo, Japan

[21] Appl. No.: 822,106

[22] Filed: Jan. 24, 1986

[30] Foreign Application Priority Data

Jan. 25, 1985 [JP] Japan .................. 60-012211

[51] Int. Cl.$^4$ .................. G02B 26/10; G02B 9/06
[52] U.S. Cl. .................. 350/480; 350/6.1; 350/6.8
[58] Field of Search .................. 350/6.1, 6.8, 434, 479, 350/480

[56] References Cited

U.S. PATENT DOCUMENTS

| | | | |
|---|---|---|---|
| 3,045,545 | 7/1962 | Korones et al. | 350/469 |
| 3,973,833 | 8/1976 | Lawson | 350/6.8 |
| 4,179,183 | 12/1979 | Tateoka et al. | 350/6.1 |
| 4,269,478 | 5/1981 | Maeda et al. | 350/6.8 X |
| 4,277,128 | 7/1981 | Kawamura | 350/6.8 |
| 4,343,531 | 8/1982 | Tateoka et al. | 350/6.5 |
| 4,353,617 | 10/1982 | Tokumitsu et al. | 350/6.8 |
| 4,357,627 | 11/1982 | Johnson | 358/348 |
| 4,390,235 | 6/1983 | Minoura | 350/6.1 |
| 4,400,063 | 8/1983 | Hayashida | 350/6.8 X |
| 4,401,362 | 8/1983 | Maeda | 350/6.8 |
| 4,436,383 | 3/1984 | Maeda | 350/6.8 X |
| 4,496,209 | 1/1985 | Itoh et al. | 350/6.8 |
| 4,497,548 | 2/1985 | Burris | 350/560 |
| 4,571,035 | 2/1986 | Sakuma | 350/6.8 |

OTHER PUBLICATIONS

How to Select Acousto–Optic Modulators, Barry Grossman, Harris Corporation, Government Communications System Division.

Primary Examiner—John K. Corbin
Assistant Examiner—Scott J. Sugarman
Attorney, Agent, or Firm—Oblon, Fisher, Spivak, McClelland & Maier

[57] ABSTRACT

An f$\theta$ lens for use in a light beam scanner for deflecting a monochromatic or quasi-monochromatic light beam. The f$\theta$ lens comprises two positive-meniscus lenses having concave surfaces directed to a deflection point about which the light beam is deflected. The lenses have lens surfaces having radii of curvature R1, R2, R3, R4 in order from the deflection point, and have a combined focal length f, the f$\theta$ lens meeting the following conditions:

$$0.8 \leq \frac{R2}{R4} \leq 1.2 \quad \text{(i)}$$

$$0.76 \leq -\frac{R2}{f} \leq 0.96. \quad \text{(ii)}$$

6 Claims, 7 Drawing Figures (I) (II)

(I) (II)

Fθ LENS FOR USE IN LIGHT BEAM SCANNER

BACKGROUND OF THE INVENTION

1. Field of the Invention

The present invention relates generally to an fθ lens for use in a light beam scanner and more particularly to an fθ lens composed of two positive-meniscus lenses for use in a light beam scanner.

2. Discussion of the Background

Light beam scanners for deflecting a monochromatic light beam such as a laser beam or a quasimonochromatic light beam such as a light beam emitted from a monochromatic fluorescent lamp have been widely known in relation to optical printers and information readout devices.

In such light beam scanners, the light beam is converged into a light spot on a surface being scanned such as the surface of a photosensitive recording medium or an original document carrying information to be read out. Since the light beam is normally deflected by a rotating polygonal mirror, a hologram grating disc, or the like, the light beam is deflected at a constant angular velocity. Where the deflected light beam converged by an ordinary convergent lens on the surface being scanned, the focused beam spot does not move on the surface or scan the surface at a uniform speed.

An fθ lens is a lens used for equalizing the scanning speed of a light beam which is being deflected at a constant angular velocity. When a light beam to be deflected falls on an fθ lens at an incident angle of θ, the distance of a focused beam spot on the surface being scanned from the optical axis is given by fθ where f is the focal length of the fθ lens.

Single-element fθ lenses among conventional compact fθ lenses require a substantially long optical path to obtain a desired scanning area length since the angle of deflection that can be covered by a light beam deflected by the fθ lens is small. Therefore, a light beam scanner employing such fθ lens cannot be of a compact construction.

A prior two-element fθ lens designed for light beam deflection through a wide angle is disclosed by Japanese Laid-Open Patent Publication No. 59(1984)-147316. The effective deflection angle, or the allowable range of a deflected light beam with respect to its incident angle, of the disclosed fθ lens is relatively large, i.e., 70 degrees or greater. The fθ lens however requires as one element a special rotationally asymmetric lens known as a toric lens, and hence cannot easily be manufactured and is costly to manufacture.

SUMMARY OF THE INVENTION

Therefore, it is an object of the present invention to provide an fθ lens for use in light beam scanners which has a wide effective deflection angle, is made of two elements, and can easily be manufactured at a low cost.

According to the present invention, there is provided an fθ lens for use in a light beam scanner for deflecting a monochromatic or quasi-monochromatic light beam, comprising two positive-meniscus lenses having concave surfaces directed to a deflection point about which the light beam is deflected, the lenses having lens surfaces with radii of curvature R1, R2, R3, R4 in order from the deflection point, the lenses having a combined focal length f, the fθ lens meeting the following conditions:

$$0.8 \leq \frac{R2}{R4} \leq 1.2 \quad \text{(i)}$$

$$0.76 \leq -\frac{R2}{f} \leq 0.96. \quad \text{(ii)}$$

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
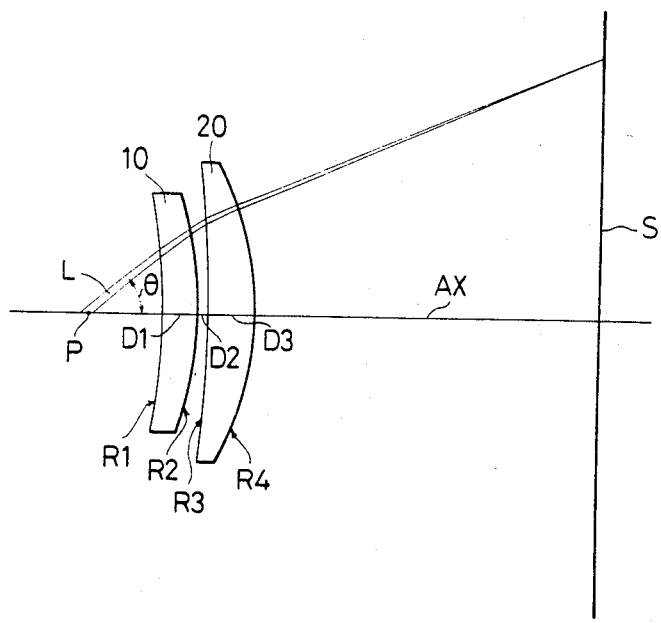
FIG. 1 is a schematic view of an fθ lens according to the present invention.

Various other objects, features and attendant advantages of the present invention will be more fully appreciated as the same becomes better understood from the following detailed description when considered in connection with the accompanying drawings in which like reference characters designate like or corresponding parts throughout the several views and wherein As shown in FIG. 1, an fθ lens according to the present invention comprises two positive-meniscus lenses 10, 20. The two meniscus lenses 10, 20 have a common optical axis Ax and are arranged such that their concave surfaces are directed toward a deflection point P. The deflection point P is a point about which a light beam L is deflected at a constant angular velocity. The light beam L which has been adjusted into parallel rays and fallen on the fθ lens at an incident angle θ is caused by the fθ lens to converge as a beam spot on a surface S to be scanned. When the scanning speed of the light beam impinging upon the lens in an incident angle range of from $-\theta_{MAX}$ to $+\theta_{MAX}$ is constant, $2\theta_{MAX}$ is referred to as the effective deflection angle.

The lens surfaces have radii of curvature R1, R2, R3, R4 in order from the deflection point P, and the fθ lens has a combined focal length f. The fθ lens meets the following conditions:

$$0.8 \leq \frac{R2}{R4} \leq 1.2 \quad \text{(i)}$$

$$0.76 \leq -\frac{R2}{f} \leq 0.96. \quad \text{(ii)}$$

Lenses are generally subject to various aberrations. The fθ lens does not require substantial corrections for spherical aberration and coma since the diameter of the incident light beam is much smaller than the aperture of the lens. Chromatic aberration is also not problematic with the fθ lens since the light beam used therewith is monochromatic light or quasi-monochromatic light. The problems that should be taken into account in designing the fθ lens are curvature of field and fθ characteristics. If the curvature of field were large, the diameter of the beam spot on the surface being scanned would vary from place to place, and the light scanning resolution would be lowered. If the fθ characteristics were poor, the scanning speed would not be constant, with the result that an image written by the scanning light beam would be distorted.

The aforesaid conditions (i) and (ii) are given to improve the curvature of field and the fθ characteristics. If the upper limit of the condition (i) and the lower limit of the condition (ii) were exceeded, the curvature of field in the meridional plane would be too small. If the lower limit of the condition (i) and the upper limit of the condition (ii) were exceeded, the curvature of field in the meridional plane would be too large. If the ranges of the conditions (i) and (ii) were exceeded, no good fθ characteristics would be achieved.

Curvature of field in the sagittal plane is not substantially problematic since it, even if considerably large, can easily be removed by a surface irregularity correcting optical system. The term "surface irregularity" used herein means an inclination of a mirror surface of a rotating polygonal mirror out of parallel with adjacent mirror surfaces, i.e., the axis of the rotating polygonal mirror.

Examples of the present invention will be described below. Designated in each Example at D1, D2, D3 are distances between the lens surfaces. N1, N2, N3 are refractive indexes of the glass materials of the lenses 10, 20 and the refractive index of an air layer between the lenses 10, 20. The values given below are standardized with f=100.0.

(Example 1)

```
f = 100.0, R2/R4 = 1.2
R1 = -154.62500
D1 = 10.3100 N1 = 1.51118
R2 = -91.85400
D2 = 2.5800 N2 = 1.00000
R3 = -302.75600
D3 = 14.1700 N3 = 1.76605
R4 = -76.54500
```

The distance between the deflection point P and the first lens surface is 21.6200.

Figure 2:
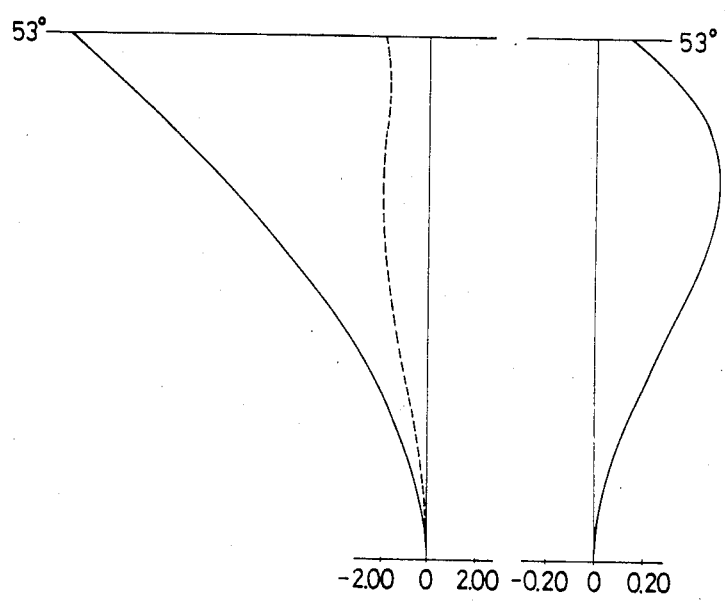
FIGS. 2 through 6 are diagrams each showing curvature of field and fθ characteristics of the present invention.

FIG. 2 shows curvature of field (I) (the broken-line curve indicates a curvature of field in the meridional plane, and the solid-line curve a curvature of field in the sagittal plane), and fθ characteristics (II). In example 1 and following Examples, the light beam expected is monochromatic light having a wavelength of 780 nm, and the effective deflection angle is 106 degrees, i.e., the effective half angle of view is 53 degrees.

(Example 2)

```
f = 100.0, R2/R4 = 1.1
R1 = -161.82300
D1 = 10.79000 N1 = 1.51118
R2 = -88.11900
D2 = 2.70000 N2 = 1.00000
R3 = -316.85000
D3 = 14.83000 N3 = 1.76605
R4 = -80.10800
```

The distance between the deflection point P and the first lens surface is 22.62600.

Figure 3:
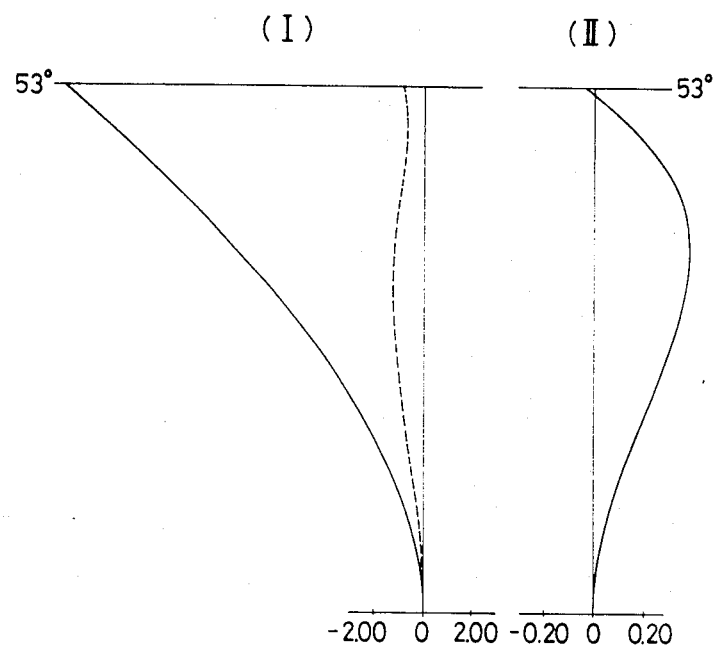

FIG. 3(I) shows curvature of field (the broken-line curve indicates a curvature of field in the meridional plane, and the solid-line curve a curvature of field in the sagittal plane), and FIG. 3(II) shows fθ characteristics.

(Example 3)

```
f = 100.0, R2/R4 = 1.0
R1 = -170.46100
D1 = 11.37000 N1 = 1.51118
R2 = -84.38400
D2 = 2.84000 N2 = 1.00000
R3 = -333.76400
D3 = 15.62000 N3 = 1.76605
R4 = -84.38400
```

The distance between the deflection point P and the first lens surface is 24.50000.

Figure 4:
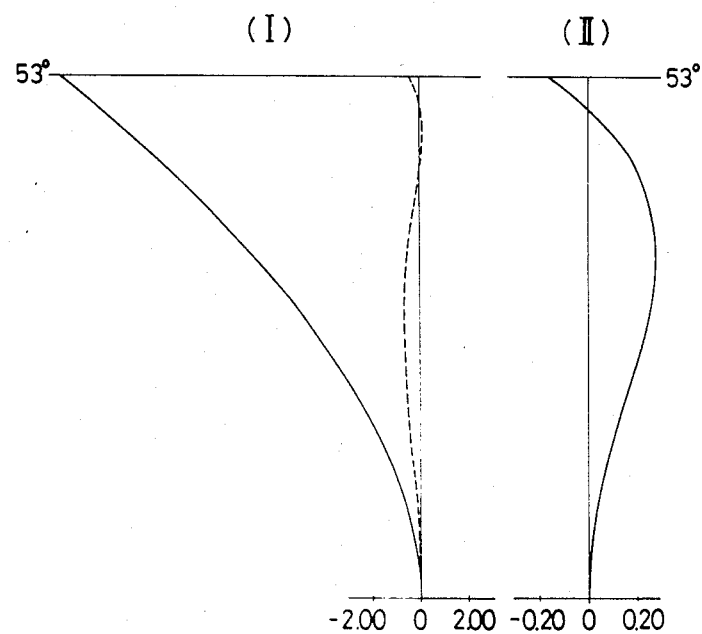

FIG. 4(I) shows curvature of field (the broken-line curve indicates a curvature of field in the meridional plane, and the solid-line curve a curvature of field in the sagittal plane), and FIG. 4(II) shows fθ characteristics.

(Example 4)

```
f = 100.0, R2/R4 = 0.9
R1 = -181.01800
D1 = 12.07000 N1 = 1.51118
R2 = -80.65000
D2 = 3.02000 N2 = 1.00000
R3 = -354.43500
D3 = 16.59000 N3 = 1.76605
R4 = -89.61100
```

The distance between the deflection point P and the first lens surface is 25.31000.

Figure 5:
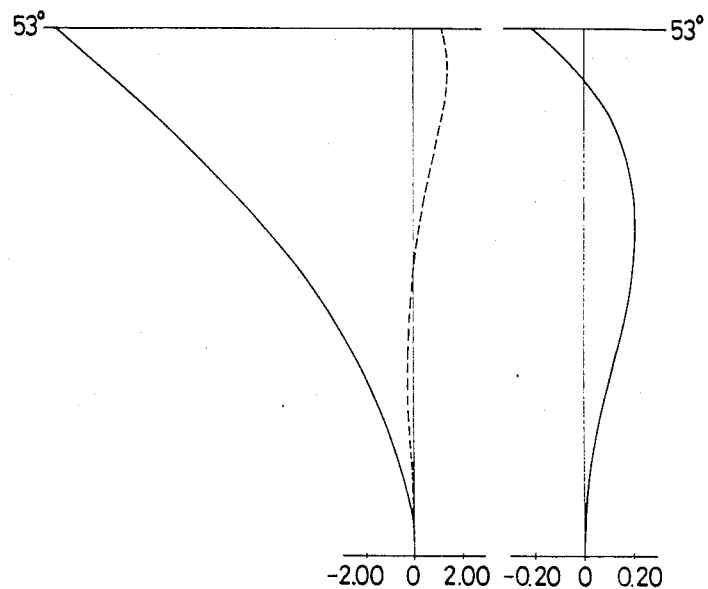

FIG. 5(I) shows curvature of field (the broken-line curve indicates a curvature of field in the meridional plane, and the solid-line curve a curvature of field in the sagittal plane), and FIG. 5(II) shows fθ characteristics.

(Example 5)

```
f = 100.0, R2/R4 = 0.8
R1 = -194.21600
D1 = 12.95000 N1 = 1.51118
R2 = -76.91500
D2 = 3.24000 N2 = 1.00000
R3 = -380.27600
D3 = 17.80000 N3 = 1.76605
R4 = -96.14400
```

The distance between the deflection point P and the first lens surface is 27.16000.

Figure 6:
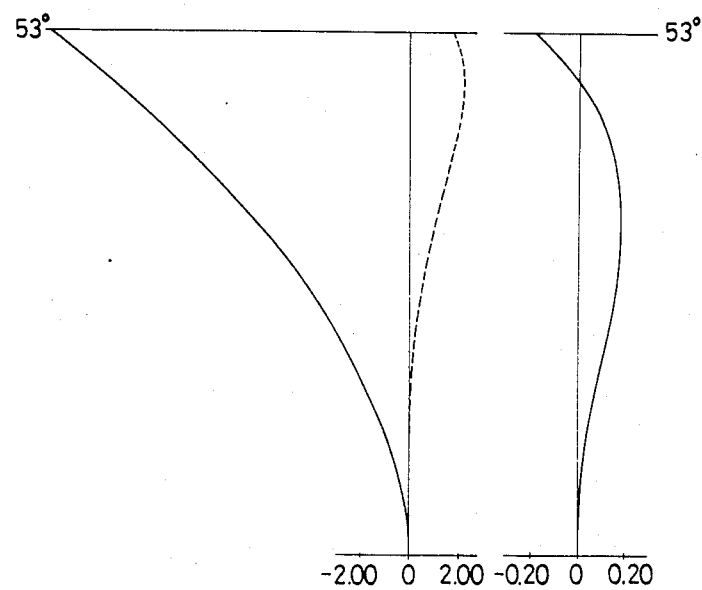

FIG. 6(I) shows curvature of field (the broken-line curve indicates a curvature of field in the meridional plane, and the solid-line curve a curvature of field in the sagittal plane), and FIG. 6(II) shows fθ characteristics.

Each of above five Examples has a small curvature of field in the meridional plane, and good fθ characteristics. Although the curvature of field in the sagittal plane is considerably large, it causes substantially no problem since it can easily be corrected by a surface irregularity correcting optical system as described above.

Figure 7:
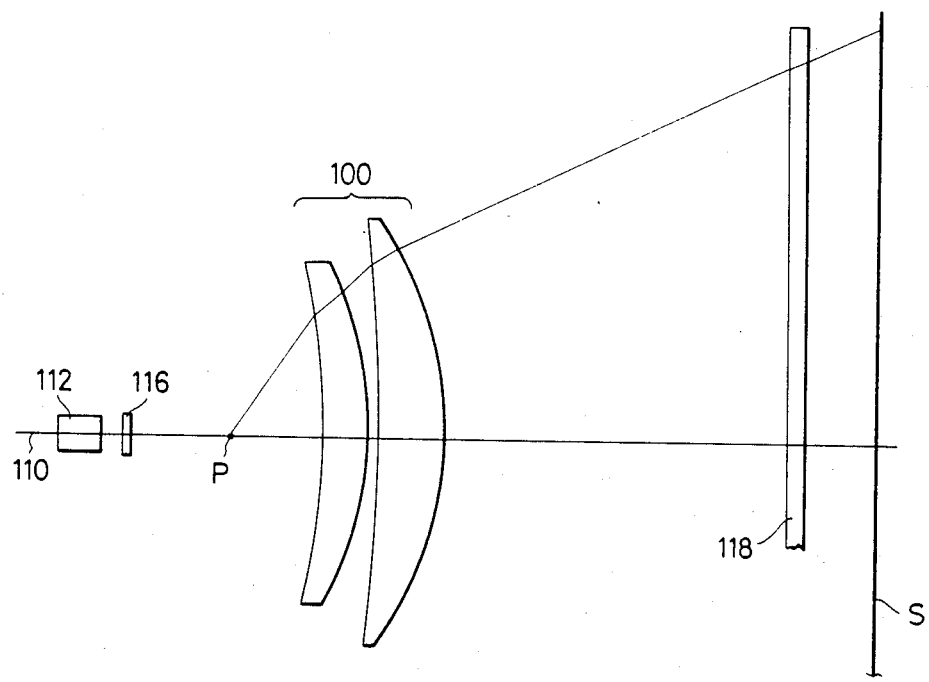
FIG. 7 is a schematic view explanating the manner in which the fθ lens of the invention is used.

FIG. 7 shows the manner in which the fθ lens according to the present invention is used. A laser beam emitted from a laser beam source 110 such as a semiconductor laser is adjusted by a collimator lens 112 into parallel rays which then enter a cylindrical lens 116. The cylindrical lens 116 causes the parallel-ray beam to converge in the vicinity of a deflection point P in the sagittal direction normal to the sheet of FIG. 7.

The light beam is then passed through an fθ lens 100 and a cylindrical lens 118 and impinges upon a surface S to be scanned. In the meridional plane, the light beam is caused by the fθ lens 100 to converge on the surface S. In the sagittal plane, the fθ lens 100 and the cylindrical lens 118 serve to couple the deflection point P and the position of the main scanning line on the surface S in conjugate relationship to each other, thus constituting a surface irregularity correcting optical system. Therefore, the light beam is focused as a beam spot on the main scanning line on the surface S being scanned, and is moved at a uniform speed along the main scanning line to scan the surface S when the light beam is deflected at a constant angular velocity.

As described above, the present invention provides a novel fθ lens for use in light beam scanners. Since the fθ lens of the invention is a two-element lens, it has quite a large effective deflection angle close to 110° and good curvature of field and fθ characteristics.

Since the two lenses of the fθ lens are positive-meniscus lenses, but not special rotationally asymmetric lenses, they can easily be manufactured inexpensively.

Inasmuch as the fθ lens of the invention has quite a large deflection angle, the optical path length between the deflection point and the surface to be scanned in a light beam scanner can be reduced, and the light beam scanner can be made compact.

Light beam scanners employing the fθ lens of the present invention can be incorporated in optical printers and information readout devices.

Although a certain preferred embodiment has been shown and described, it should be understood that many changes and modifications may be made therein without departing from the scope of the appended claim.

What is claimed is:

1. An fθ lens for use in a light beam scanner for deflecting a light beam, said fθ lens comprising:
   two positive-meniscus lenses having concave surfaces directed to a deflection point about which the light beam is deflected, said lenses having lens surfaces having radii of curvature R1, R2, R3, R4 in order from said deflection point, said lenses having a focal length f of the entire lens system as a whole, said fθ lens meeting the following conditions:

$$0.8 \leq \frac{R2}{R4} \leq 1.2 \quad \text{(i)}$$

$$0.76 \leq -\frac{R2}{f} \leq 0.96. \quad \text{(ii)}$$

2. An fθ lens according to claim 1, wherein the light beam is monochromatic.

3. An fθ lens according to claim 1, wherein said light beam is quasi-monochromatic.

4. A light beam scanner comprising:
   a light beam source for producing a light beam;
   deflection means for deflecting said light beam in a scanning direction;
   an fθ lens including two positive-meniscus lenses having concave surfaces directed toward said deflecting means, saids lenses having lens surfaces with radii of curvature R1, R2, R3, R4 in order from said deflection means, said lenses having a focal length f of the entire lens system as a whole, said fθ lens meeting the following conditions:

$$0.8 \leq \frac{R2}{R4} \leq 1.2 \quad \text{(i)}$$

$$0.76 \leq -\frac{R2}{f} \leq 0.96 \quad \text{(ii)}$$

5. A light beam scanner according to claim 4, wherein said light beam is monochromatic.

6. A light beam scanner according to claim 4, wherein said light beam is quasi-monochromatic.

* * * * *